United States Patent [19]
Toyoshima et al.

[11] 3,919,291
[45] Nov. 11, 1975

[54] N-ETHYLCARBAMINOMETHYLISOLEU-CINE

[75] Inventors: Shigeshi Toyoshima; Seizo Kanao, both of Tokyo; Takeshi Toyoda, Sagamihara; Tadashi Suyama, Kawasaki, all of Japan

[73] Assignee: Ajinomoto Co., Inc., Tokyo, Japan

[22] Filed: Mar. 14, 1974

[21] Appl. No.: 451,209

Related U.S. Application Data

[60] Division of Ser. No. 281,042, Aug. 16, 1972, Pat. No. 3,845,097, which is a continuation-in-part of Ser. No. 69,993, Sept. 4, 1970, Pat. No. 3,801,633.

[30] Foreign Application Priority Data

Aug. 19, 1971  Japan.............................. 46-63250
Aug. 19, 1971  Japan.............................. 46-63252

[52] U.S. Cl.............................................. 260/482 C
[51] Int. Cl.$^2$..................................... C07C 101/26
[58] Field of Search................... 260/534 R, 482 C

[56] References Cited
OTHER PUBLICATIONS

Suyama et al., Chemical Abstracts, Vol. 66 (1967), 29058y.

Sciortino et al., Chemical Abstracts, Vol. 70 (1969), 38057g.

*Primary Examiner*—Richard L. Raymond
*Attorney, Agent, or Firm*—Hans Berman

[57] ABSTRACT

The following N-substituted amino acids have been found to combat infection with influenza virus, to counteract inflammation, or to have anti-tumor effects in mice while being relatively non-toxic in effective amounts:

N-β-naphthylaminoethylleucine,
N-β-naphthylaminomethylurethane,
N-furfurylaminoethylphenylalanine,
N-furfuryl-4-nitrophenylalanine,
N-benzylvaline,
N-2-fluorenesulfonylmethionine,
N-2-fluorenesulfonylphenylalanine,
N-lauroylleucine,
N-ethylcarbaminomethylisoleucine,
N-β-naphthylaminomethylthreonine,
N-9-fluorenylacetylphenylalanine,
N-myristoylisoleucine,
N-β-naphthalenesulfonyltryptophan, and
N-propionylvaline.

1 Claim, No Drawings

N-ETHYLCARBAMINOMETHYLISOLEUCINE

This application is a division of application Ser. No. 281,042, filed Aug. 16, 1972, now U.S. Pat. No. 3,845,097, which in turn is a continuation-in-part of the copending application Ser. No. 69,993, filed on Sep. 4, 1970, now U.S. Pat. No. 3,801,633, As has been disclosed in our earlier application, certain N-substituted amino acids are effective in combating infection with influenze virus in vivo.

It has now been found that other N-substituted amino acids have similar antiviral effects, but also compare favorably with hydrocortisone and acetylsalicylic acid in their therapeutic index values as antiinflammatory agents, and with Mitomycin-C and Bleomycin in their therapeutic index values for anti-tumor activity in mice.

While the compounds of the invention are useful in the form of the free acids, the more soluble salts with pharmaceutically acceptable bases, particularly the alkali metal salts, the alkaline earth metal salts, and organic amine salts, such as the sodium, potassium, magnesium, calcium, ammonium, monoethanolamine and diethanolamine salts which are generally more soluble in water than the free acids, and are not more toxic than the free acids in equimolar amounts.

The compounds of the invention are administered orally or parenterally in therapeutic compositions which contain one or more of the compounds as active agents in combination with a pharmaceutical carrier which may be solid or liquid, depending on the intended mode of application. Liquid compositions may be formulated in a conventional manner for oral application or for injection in dosage unit form.

The solid compositions, such as tablets, pills, powders, or granules, are prepared by combining the active agents of the invention with solid pharmaceutical carriers conventional in themselves, such as calcium carbonate, lactose, sucrose, sorbitol, mannitol, starch, amylopectin, methylcellulose, or gelatin. Compacting of the comminuted ingredients may be facilitated by the use of magnesium stearate, calcium stearate, or polyethylene glycol.

Orally applicable liquid compositions may be emulsions, solutions, or suspensions of the active agents in water, liquid paraffin and like pharmaceutically acceptable inert liquids which may additionally contain surface active agents to keep the active agents and other ingredients dispersed in the liquid carrier, and adjuvants for improving the taste or odor of the composition, as is well known in itself.

In preparing compositions of the invention for parenteral application, it is preferred to disperse the N-substituted amino acids of the invention in sterilized water containing enough alkaline material to dissolve the active agents, and to transfer dosage units of the solution to vials which are sealed thereafter.

The compounds of the invention differ from each other in their therapeutic effects and their toxicity. In their use against influenze virus and as anti-tumor agents in mice, the desired therapeutic effects may be achieved with some by a dosage of 400 mg per day applied orally or 200 mg per day applied parenterally, whereas others may need to be administered orally at a rate of 2,000 mg per day or parenterally at 1,000 mg per day. A single daily dose is preferred. As anti-inflammatory agents, the compounds of the invention may be used in humans in dosages ranging from 50 to 4000 mg per day, usually orally. Preferably, they are used at a rate of 200 – 2000 mg per day and in small dosage units administered not more than a couple of hours apart. More or less frequent and larger and smaller unit dosages are, of course, also possible.

Those compounds of the invention which exist either in optically active (D or L) forms or in the optically inactive racemic form are equally effective in all forms.

Only N-benzylvaline, N-lauroylleucine and N-propionylvaline were known heretofore. The other eleven N-substituted amino acids enumerated above are new, but are readily prepared by means of procedures known in themselves. The Schotten-Baumann reaction may be used in preparing the N-2-fluoroenesulfonyl derivatives of methionine and phenylalanine, the N-9-fluorenylacetyl derivative of phenylalanine, the N-myristoyl derivative of isoleucine and the N-β-naphthalenesulfonyl derivative of tryptophan. Furfural may be reacted with 4-nitrophenylalanine in an alkaline aqueous medium in the presence of sodium borohydride to N-furfuryl-4-nitrophenylalanine. β-Naphthylamine may be reacted with leucine, urethane or threonine in the presence of formaldehyde in preparing the N-β-naphthylaminomethyl derivative of leucine, urethane or threonine. Urethane may be reacted with isoleucine in the presence of formaldehyde to yield the N-ethylcarbaminomethyl derivative of isoleucine, and furfurylamine may be reacted with phenylalanine in the presence of formaldehyde to yield the N-furfurylaminomethyl derivative of phenylalanine.

The following Examples further illustrate the preparation of the N-substituted amino acids of this invention, of their salts, and of compositions containing the active agents of the invention.

EXAMPLE 1

A solution of 14.3 g β-naphthylamine in 100 ml 60% aqueous ethanol was added to a mixture of 13.1 g L-leucine, 60 ml 37% formaldehyde solution and 250 ml 60% aqueous ethanol. The mixture so obtained was refluxed at 80°C for 1 hour on a water bath. A small amount of oily material precipitated and was filtered off. The filtrate was concentrated in a vacuum to precipitate crystals of N-β-naphthylaminomethyl-L-leucine which were filtered off, washed with acetone, and recrystallized from absolute ethanol. The purified, very small crystals weighed 18.9 g (66% yield) and melted at 199°C.

Elementary analysis: Calculated for $C_{17}H_{22}O_2N_2$: 71.30% C; 7.74% H; 9.74% N. Found: 72.08% 7.71 9.48.

EXAMPLE 2

A solution of 2.86 g β-naphthylamine in 25 ml 60% aqueous ethanol was added to a mixture of 1.8 g urethane, 6 ml 37% formaldehyde solution and 16 ml 60% ethanol, and then an equivalent amount of oxalic acid was added. The mixture was allowed to stand whereby crystals of N-β-naphthylaminomethylurethane oxalate were gradually precipitated. They were filtered off and recrystallized from absolute ethanol. The purified, rhombic crystals weighed 1.76 g (30% yield) and melted at 202°C.

Elementary analysis: Calculated for $C_{30}H_{34}O_8N_4$: 9.68% N.

Found: 9.37.

EXAMPLE 3

A solution of 2.14 g furfurylamine in 230 ml 90% aqueous ethanol was added to a warm solution of 3.3 g L-phenylalanine in 30 ml 37% formaldehyde solution. The resultant, pale brownish, clear solution was refluxed for 10 hours on a water bath. A small amount of insoluble material was filtered off, and the filtrate was concentrated in a vacuum. The precipitated crystals of N-furfurylaminomethyl-L-phenylalanine were filtered off and crystallized from a mixture of absolute ethanol and anhydrous ether. The purified, very small crystals weighed 2.06 g (36.5% yield) and melted at 170°C.

Elementary analysis: Calculated for $C_{15}H_{18}N_2O_3 \cdot \frac{1}{2}\lambda H_2O$: 63.50% C; 6.72% H. Found: 63.33 7.23.

EXAMPLE 4

4.8 g Furfural was added to a solution of 10.5 g L-4-nitrophenylalanine in 25 ml 2N sodium hydroxide solution with stirring, and thereafter a solution of 0.6 g sodium borohydride in a little water was added in small batches with ice cooling to keep the temperature at 15°C. After stirring for 30 minutes, 4.8 g furfural and 0.6 g sodium borohydride were further added. Stirring was continued for an additional 2 hours. The unreacted furfural was extracted with ether, and the aqueous layer was acidified with dilute hydrochloric acid to precipitate crystalline N-furfuryl-L-4-nitrophenylalanine. When washed with absolute ethanol and recrystallized from 40% acetic acid, the needle-shaped crystals weighed 18.8 g (65% yield) and melted at 240°C. $[\alpha]_D^{28} = +23.75°$ (C=2.00, 1N NaOH).

Elementary analysis: Calculated for $C_{14}H_{14}O_5N_2$: 57.93% C; 4.86% H; 9.65% N. Found: 58.20 5.10 9.54.

EXAMPLE 5

21.2 g Benzaldehyde was added to a solution of 23.4 g L-valine in 100 ml 2N sodium hydroxide solution with stirring. To the mixed solution was added a solution of 2.28 g sodium borohydride in a small amount of water. After stirring for 1 hour, 21.2 g benzaldehyde and 2.28 g sodium borohydride were further added, and stirring was continued for an additional 2 hours. The unreacted benzaldehyde was extracted with ether, and the aqueous layer was neutralized to pH 7.0 with dilute hydrochloric acid to precipitate N-benzyl-L-valine crystals. The crystals were filtered off, washed with water and ethanol, and recrystallized from acetic acid. The purified, needle-shaped crystals weighed 33 g (80% yield) and melted at 274°C. $[\alpha]_D^{27} = +18.50$ (C=2.0, 6N HCl).

Elementary analysis: Calculated for $C_{12}H_{17}O_2N$: 69.53% C; 8.27% H; 6.76% N. Found: 69.43 8.44 6.81.

EXAMPLE 6

A solution of 10.6 g 2-fluorenesulfonyl chloride in 150 ml acetone and a solution of 10.6 g sodium carbonate in 80 ml water were added dropwise alternatively over a period of 30 minutes with stirring to a solution of 5.9 g DL-methionine in 20 ml 10% sodium hydroxide solution at room temperature. Stirring was continued for 30 minutes at 50°C and for 3 additional hours at room temperature. The reaction mixture was then made acid to Congo Red with dilute hydrochloric acid, and partly evaporated in a vacuum to remove the acetone. The precipitated crystals of N-2-fluorenesulfonyl-DL-methionine were filtered off, washed with water and ethanol, and recrystallized from acetic acid. The purified, needle-shaped crystals weighed 11.2 g (75% yield) and melted at 168°C.

Elementary analysis: Calculated for $C_{18}H_{19}NS_2$: 57.27% C; 5.07% H; 3.71% N. Found: 57.24 5.27 3.68.

EXAMPLE 7

A solution of 5.3 g 2-fluorenesulfonyl chloride in 150 ml acetone and a solution of 5 g sodium carbonate in 50 ml water were added dropwise alternatively with stirring to a solution of 3.3 g L-phenylalanine in 10 ml 10% sodium hydroxide solution. Stirring was continued for 4 hours at 50°C, and the reaction mixture was then adjusted to pH 3-4 with dilute hydrochloric acid and partly evaporated in a vacuum to remove the acetone and to induce crystallization of N-2-fluoroenesulfonyl-L-phenylalanine. The crystals were filtered off, washed with water, and recrystallized from acetone. The purified, needle-shaped crystals weighed 5.2 g (66% yield) and melted at 141°C. $[\alpha]_D^{31} = -2.86°$ (C=2.094, acetone).

Elementary analysis: Calculated for $C_{22}H_{19}O_4NS$: 67.15% C; 4.86% H; 3.56% N. Found: 66.94 5.21 3.38.

EXAMPLE 8

21.9 g Lauroyl chloride and a solution of 15.9 g sodium carbonate in 110 ml water were added dropwise alternatively over a period of 30 minutes with stirring to a solution of 13.1 g L-leucine in 40 ml 10% sodium hydroxide solution at room temperature. After stirring for 3 hours at that temperature, the reaction mixture was made acid to Congo Red with dilute hydrochloric acid. The precipitated crystals of N-lauroyl-L-leucine were filtered out, washed with water and recrystallized from dilute methanol. The purified, plate-shaped crystals weighed 28.2 g (90% yield) and melted at 109°C. $[\alpha]_D^{29} = -16.24°$ (C=1.108, absolute ethanol).

Elementary analysis:
Calculated for $C_9H_{35}O_3N$: 68.96% C; 11.25% H; 4.46% N.
Found: 69.09 11.33 4.45.

EXAMPLE 9

4.3 g DL-Isoleucine, 12 ml 37% formaldehyde solution and 40 ml 60% ethanol were warmed until a homogeneous solution was formed to which a solution of 3.6 g urethane in 20 ml ethanol was added. The resulting reaction was exothermic, and the reaction mixture was stored in a refrigerator to precipitate crystals of N-ethylcarbaminomethyl-DL-isoleucine which were filtered off, washed with acetone and recrystallized from dimethylformamide. The purified, plate-shaped crystals weighed 3.0 g (40% yield) and melted at 166°C.

Elementary analysis:
Calculated for $C_{10}H_{20}O_4N_2$: 51.70% C; 8.68% H; 12.06% N.
Found: 51.78 8.56 12.12.

EXAMPLE 10

2.4 g L-Threonine, 6 ml 37% formaldehyde solution and 45 ml 60% ethanol were heated until a homogeneous solution was formed to which a solution of 2.86 g β-naphthylamine in 50 ml 60% ethanol was added. The resulting reaction was exothermic, and a small amount of oily material precipitated and was filtered off. The filtrate was stored for several days, whereby crystals of N-β-naphthylaminomethyl-L-threonine were precipitated. They were recovered by filtration, washed with 50% ethanol, and recrystallized from dimethylformamide. The purified, platelet-shaped crystals weighed 1.9 g (35% yield) and melted at 218°C. $[\alpha]_D^{29} = -123.52°$ (C=0.51, 0.2N NaOH).

Elementary analysis:

Calculated for $C_{15}H_{17}O_3N_2$: 65.68% C; 6.61% H; 10.21% N. Found: 66.65 6.34 9.94.

EXAMPLE 11

A solution of 4.8 g 9-fluorenylacetyl chloride in 20 ml ether was added dropwise over a period of 20 minutes with stirring to a mixture of 3.3 g L-phenylalanine, 8 ml 10% sodium hydroxide solution and 100 ml 10% sodium carbonate solution at room temperature. Stirring was continued for 3 additional hours at room temperature, and the reaction mixture was then made acid to Congo Red with dilute hydrochloric acid. The precipitated crystals of N-9-fluorenylsulfonylacetyl-L-phenylalanine were filtered out and recrystallized from acetone. The purified crystals weighed 5.9 g (80% yield) and melted at 188°C.

Elementary analysis:

Calculated for $C_{24}H_{21}O_3N$: 77.60% C; 5.69% H; 3.77% N.

Found: 77.14 5.24 3.61.

EXAMPLE 12

24.6 g Myristoyl chloride and a solution of 10.6 g sodium carbonate in 110 ml water were added dropwise alternatively over a period of 30 minutes with stirring to a mixture of 13.1 g L-isoleucine, 40 ml 10% sodium hydroxide solution and 60 ml acetone at room temperature. Stirring was continued for additional 30 minutes at that temperature, and the reaction mixture was then made acid to Congo Red with dilute hydrochloric acid. The precipitated crystals of N-myristoyl-L-isoleucine were filtered out and recrystallized from 50% ethanol. The purified, plate-shaped crystals weighed 31 g (91% yield) and melted at 98 - 99°C. $[\alpha]_D^{28} = +5.30°$ (C=2.0, absolute ethanol).

Elementary analysis:

Calculated for $C_{20}H_{39}NO_3$: 70.04% C; 11.51% H; 4.10% N. Found: 70.26 11.76 3.96.

EXAMPLE 13

A solution of 4.5 g β-naphthalenesulfonyl chloride in 50 ml ether was added dropwise over a period of 15 minutes with stirring to a mixture of 4.1 g DL-tryptophan, 10 ml 10% sodium hydroxide solution and 50 ml 10% sodium carbonate solution at room temperature. Stirring was continued for additional 3 hours, and the reaction mixture was then made acid to Congo Red with dilute hydrochloric acid. The precipitated crystals of N-β-naphthalenesulfonyl-DL-tryptophan were filtered out and recrystallized from ethanol. The purified, plate-shaped crystals weighed 5.0 g (64% yield) and melted at 207°C.

Elementary analysis:

Calculated for $C_{21}H_{18}O_4N_2S$: 63.94% C; 4.60% H; 7.10% N.

Found: 63.83 4.83 7.06.

EXAMPLE 14

16.2 g Propionic anhydride was added to a solution of 11.7 g L-valine in 50 ml 33% sodium hydroxide solution. After stirring for 5 minutes, 16.2 g propionic anhydride was again added. Stirring was continued for additional 3 hours, and the reaction mixture was then acidified to pH 3-4 with 6N hydrochloric acid. The precipitated crystals of N-propionyl-L-valine were filtered out, washed with water and recrystallized from 80% methanol. The purified, columnar crystals weighed 8 g (46% yield, and melted at 137°C.

$[\alpha]_D^{29} = +11.27°$ (C=1.992, methanol).

Elementary analysis:

Calculated for $C_8H_{15}O_3N$: 55.47% C; 8.72% H; 8.08% N.

Found: 55.34 8.55 7.97.

EXAMPLE 15

2.83 g (0.01 Mole) N-furfurylaminomethyl-L-phenylalanine hemihydrate was added to a 5% aqueous solution containing 0.84 g (0.01 mole) sodium bicarbonate to form a clear solution. The solution was concentrated under reduced pressure to crystallize the sodium salt of N-furfurylaminomethyl-L-phenylalanine.

The sodium salts of the other N-substituted amino acids except for N-β-naphthylaminomethylurethane, whose synthesis was described in Examples 1, and 4 to 14, were prepared in the same manner.

EXAMPLE 16

2.07 g (0.01 Mole) N-benzyl-L-valine was added to an aqueous, 10% solution of 0.56 g potassium hydroxide to form a clear solution which was evaporated in a vacuum until the potassium salt of N-benzyl-L-valine crystallized.

The potassium salts of the other N-substituted amino acids described above except for N-β-naphthylaminomethylurethane were prepared in the same manner.

EXAMPLE 17

2.90 g (0.01 Mole) N-furfuryl-L-4-nitrophenylalanine was added to an excess amount of concentrated aqueous ammonia solution to form a clear solution. The solution was concentrated in a vacuum to crystallize the ammonium salt of N-furfuryl-L-4-nitrophenylalanine.

The ammonium salts of the other afore-mentioned N-substituted amino acids except for N-β-naphthylaminomethylurethane were prepared in the same manner.

EXAMPLE 18

3.77 g (0.01 Mole) N-2-fluorenesulfonyl-DL-methionine was added to an aqueous solution of 0.61 g (0.01 mole) monoethanolamine to form a clear solution. The expected monoethanolamine salt was prepared in crystalline form by partly evaporating the solution. Similarly, the diethanolamine salt was obtained when an equivalent amount of diethanolamine was substituted for the monoethanolamine.

The mono- and diethanolamine salts of the other N-substituted amino acids except for N-β-naphthylaminomethylurethane were prepared in the same manner.

EXAMPLE 19

200 kg N-β-Naphthylaminomethyl-L-leucine, 150 kg corn starch, 80 kg talc, and 2.6 kg magnesium stearate were thoroughly mixed, and 1000 capsules were charged with equal amounts of the mixture in the usual manner. The capsules are employed for the treatment of influenza and of inflammation by oral administration of 1 to 2 capsules every 6 hours.

Capsules containing one or more of the other N-substituted amino acids described above may be prepared in the same manner.

EXAMPLE 20

200 kg N-β-Naphthylaminomethyl-L-leucine, 50 kg lactose, 30 kg corn starch, 3.0 kg magnesium stearate, and 1.2 kg light liquid petrolatum were thoroughly mixed and slugged. The slugs were forced through a No. 16 screen, and the resulting granules were then compressed into 1000 tablets, each tablet containing 200 mg of the active ingredient.

The above procedure may be similarly applied to prepare tablets containing one or more of the other aforementioned N-substituted amino acids.

EXAMPLE 21

A sterile aqueous solution for intramuscular injection was prepared from 200 g N-β-naphthylaminomethyl-L-leucine, 10% sodium hydroxide solution, and 1000 ml water for injection. The active compound was dispersed in the water, and sufficient sodium hydroxide was added to form a solution of pH 7.2. The solution was sterilized by filtration. 1 Ml batches of the solution were filled into sterile vials and lyophilized, whereupon the vials were sealed. Immediately prior to use, sufficient sterile water for injection to make 1 ml of solution was added to each vial.

The above procedure may be similarly applied to prepare parenteral solutions of sodium salts of the other N-substituted amino acids except for N-β-naphthylaminomethylurethane.

The physiological effects of the compounds of the invention are illustrated by the following Examples:

EXAMPLE 22

The N-substituted amino acids of the invention prepared as described in Examples 1 and 3 to 14 were each dissolved in dilute aqueous sodium bicarbonate, while only N-β-naphthylaminomethylurethane oxalate prepared as described in Example 2 was dissolved in distilled water. Each of the solutions was sterilized by passage through a microporous filter, and single doses of varying strength were injected intraperitoneally in a standard toxicity test into male mice weighing 10 – 12 g each. The mean lethal dosage ($LD_{50}$) was determined 1 week after the injection. The results obtained are shown in Table 1 in which the several N-substituted amino acids of the invention are identified by numbers referring to Examples 1 – 14 in which their preparation is described. For comparison purposes, the known antiviral agent Amantadine (1-Adamantanamine), and the known antiinflammatory agents hydrocortisone and acetylsalicylic acid were also tested.

of the invention and of Amantadine, described as in Example 22, and with physiological saline solution as a control, 2 hours after having been infected intranasally with influenza virus A-2/Adachi/Tokyo 57. The treated mice surviving 14 days after the infection were sacrificed, and the lungs of all tested mice were inspected for consolidation. None of the untreated mice survived 14 days. The observations made were evaluated according to Ledinko's criteria, assigning scores as follows:

5 Mouse died within 5 days after infection and entire lung was consolidated.
4 Mouse survived at least 5 days, but entire lung was consolidated.
3 75% of lung consolidated.
2 50% of lung consolidated.
1 25% of lung consolidated.
0.5 5 – 15% of lung consolidated.

Table 2 lists the mortality and inhibitory effect (the average value of consolidation scores) for each group of ten mice and the dosage employed which was approximately 1/5 of $LD_{50}$.

Table 2

| Sample | Dosage mg/kg | Mortality Treated group | Inhibitory effect Treated group/ | Control group |
|---|---|---|---|---|
| Amantadine | 60 | 6 | 2.9 | 4.0 |
| Compound 1 | 300 | 4 | 2.4 | 4.0 |
| Compound 2 | 300 | 0 | 0.6 | 3.4 |
| Compound 3 | 130 | 0 | 0.7 | 3.4 |
| Compound 4 | 300 | 0 | 1.1 | 4.6 |
| Compound 5 | 300 | 0 | 1.12 | 4.6 |
| Compound 6 | 300 | 0 | 0.7 | 3.4 |
| Compound 8 | 180 | 4 | 2.5 | 4.6 |
| Compound 11 | 35 | 4 | 2.7 | 4.2 |

EXAMPLE 24

The eight N-substituted amino acids prepared in Examples 1 to 8 were suspended in an aqueous 1% carboxymethylcellulose solution, and single doses of varying strength were injected intraperitoneally into one group of male rats weighing 150 – 180 g each. 30 Minutes after the injection, the soles of 1 foot in each rat were inoculated with respective 0.1 ml doses of the irritating agents listed in Table 3. The edema caused in the inoculated foot was measured by volume comparison with a control foot of the same rat 1 hour and three hours after the inoculation. The mean effective dosage ($ED_{50}$) of each tested compound in mg/kg which reduced the edema volume by 50% is listed in Table 3 together with corresponding values for hydrocortisone and acetylsalicylic acid. The first line for each irritating agent shows the 1 hour values, the second line the three-hour values. "IE" in the Table indicates that the Table 1

| Compound | 1 | 2 | 3 | 4 | 5 | 6 | 7 | 8 | 9 |
|---|---|---|---|---|---|---|---|---|---|
| $LD_{50}$, mg/kg | 1500 | 1500 | 650 | 1500 | 1500 | 1500 | 1500 | 180 | 1500 |
| Compound | 10 | 11 | 12 | 13 | 14 | Amantadine | | Hydrocortisone | |
| $LD_{50}$, mg/kg | 1500 | 175 | 1500 | 850 | 750 | 233 | | 1250 | |
| | | Acetylsalicylic acid 790 | | | | | | | |

EXAMPLE 23

Groups of 10 mice each were injected intraperitoneally with single doses of solutions of eight compounds tested compound was ineffective.

Table 3

| | Hydro-cortisone | Acetyl-salicylic acid | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Bradikinin (50 µg/ml | <25 | 50 | 2.7 | <10 | 75 | <10 | IE | <10 | 25 | 22.4 |
| saline sol'n) | <25 | <50 | <10 | IE | 150 | <10 | IE | IE | 25 | <10 |
| Serotonine (0.04% in | >50 | 125.4 | <200 | IE | IE | IE | IE | IE | IE | 30 |
| distilled water | >50 | 150 | <75.2 | <250 | 75 | <100 | IE | <250 | IE | 30 |
| Formaldehyde (3% in | >50 | 50 | <50 | <100 | <10 | <150 | 100 | <100 | 25 | 83.3 |
| distilled water | >78 | >200 | <10 | IE | <183 | <10 | 200 | IE | 5 | 22.6 |
| Kaolin (20% in | <40 | 100 | IE | <100 | <10 | 392 | 50 | <100 | 5 | <10 |
| distilled water | >46 | 70.5 | <286 | IE | IE | 392 | 120.5 | IE | 5 | <10 |
| Hyaluronidase (200 | <25 | <50 | IE | <100 | <10 | <182 | IE | <100 | IE | <10 |
| γ/ml saline sol'n) | <25 | 50 | <80 | <10 | <10 | <80 | IE | <10 | 50 | <10 |
| Dextrane sulfate (0.5 | <26 | 200 | 75.2 | <10 | <199 | <80 | 50 | <10 | 50 | <10 |
| % in dist'd water) | <10 | 65.3 | 77 | IE | <84.3 | <80 | 100 | IE | IE | 55.6 |
| Egg White (15% in | >78 | >200 | 2.7 | <100 | IE | <50 | IE | <100 | IE | <10 |
| saline sol'n) | <10 | 70.5 | <10 | <50 | IE | <50 | IE | <50 | IE | 10 |
| Carragenin (1% in | <40 | 172 | 150 | <100 | 85.4 | <200 | IE | <100 | 50 | <10 |
| saline sol'n | <25 | 100 | <100 | <250 | <84.3 | <150 | IE | <250 | 50 | <10 |
| Yeast extract (10% | <25 | >200 | IE | IE | 177 | IE | IE | IE | 100 | 30 |
| in dist'd water) | >50 | >200 | IE | <400 | IE | IE | <10 | <400 | 100 | <10 |
| Mustard (2.5% in | <10 | 50 | <150 | IE | 150 | <150 | 70.1 | IE | 5 | <10 |
| distilled water | >15 | <50 | <285 | <200 | 150 | <285 | 85.1 | <200 | 5 | 50 |

EXAMPLE 25

Mice weighing 20 - 30 g each were arranged in matched groups of three and were injected each intraperitoneally with one million Ehrlich ascites tumor cells per 10 g of body weight. Immediately after the injection and once daily for the next five days, the mice of the several groups, except for one control group, were given intraperitoneal injections of solutions prepared in the manner of Example 15 from the compounds synthesized in Examples 9 - 14 respectively, and solutions of Mytomycin-C and Bleomycin, known anti-tumor agents. The daily dosage was one tenth of $LD_{50}$ for each tested compound.

The mice were weighed daily for ten days, the average weight increases for each group were calculated from the nine weight changes as compared to the first day's weight, and the inhibiting effect of the tested compound was calculated from the average weight increase so determined and the corresponding weight increase for the untreated control group. Table 4 lists the reduction in body weight increase in the treated mice as percentage of the body weight increase of the control group.

After the ten days, the mice were sacrificed, and the tumor cells in the ascites were counted. The inhibition of tumor cell growth is listed for each tested compound in Table 4 as the difference between tumor cells in treated and control animals as percentage of the number of tumor cells in the latter.

Table 4

| | Inhibition of body weight increasee (%) | Inhibition of tumor cell growth (%) |
|---|---|---|
| Mytomycin-C | 73.8 | 99.0 |
| Bleomycin | 35.5 | 75.4 |
| Compound 9 | 87.3 | 80.2 |
| Compound 10 | 36.4 | 75.2 |
| Compound 11 | 48.3 | 64.5 |
| Compound 12 | 80 | 80 |
| Compound 13 | 92 | 82 |
| Compound 14 | 51.7 | 98.5 |

EXAMPLE 26

Groups of mice as in Example 25 were also infected with implanted cells of Sarcoma 180 solid tumor. 24 Hours after tumor implantation, the mice of respective groups received the dosages of Mitomycin-C and of solutions of Compounds 9, 11, 13, 14, that is, the compounds synthesized in Examples 9, 11, 13, 14 and dissolved as in Example 15, by intraperitoneal injection. The injections were repeated twice in one-day intervals. A control group remained untreated.

The mice were each weighed at the beginning of the test and after 21 days. They were then sacrificed, and the tumors were weighed. Table 5 lists the average weight increase for each group and the standard deviation for each set of three weight differences, also the inhibition of tumor growth in percent of the average tumor weight in the control group.

Table 5

| Sample | Daily dosage mg/kg | Average weight increase, g | Inhibition of tumor growth, % |
|---|---|---|---|
| Control | — | 5.3±3.1 | — |
| Mitomycin-C | 1.5 | 2.5±1.8 | 71.7 |
| Compound 9 | 300 | 3.7±1.5 | 82.3 |
| Compound 11 | 35 | 4.1±2.1 | 60.5 |
| Compohnd 13 | 170 | 3.2±1.8 | 84.1 |
| Compound 14 | 300 | 4.5±0.9 | 74.9 |

EXAMPLE 27

Groups of mice as in Example 25 were also infected with implanted Ehrlich ascites tumor cells. 24 Hours after tumor implantation, and once daily for the next 3 days, the mice of the respective groups, except for one control group received the dosages of mitomycine-C and Bleomycin and of Componds 9, 11, 14, that is, the compounds synthesized in Examples 9, 11, 14 by oral administration.

Table 6 lists effect of the test compounds on the survival time of mice bearing Ehrlich ascites tumor cells by oral administration.

Table 6

| Sample | LD$_{50}$ (mg/kg, oral) | daily dosage (mg/kg) | average survival (days) | survivors* | increased life span (%) |
|---|---|---|---|---|---|
| Control | — | — | 9.8±1.0 | 0/8 | — |
| Mitomycin-C | 65 | 13 | 10.8±3.5 | 4/10 | 10.2 |
| Bleomycin | >300 | 30 | 16.5±7.3 | 8/10 | 68.4 |
| Compound 9 | >5000 | 1000 | 15.4±3.4 | 8/10 | 57.1 |
| Compound 11 | 1850 | 370 | 11.1±2.9 | 2/7 | 13.3 |
| Compound 14 | >5000 | 1000 | 14.6±5.6 | 5/7 | 49.0 |

*Survivors at the time of the death of the controls.

What is claimed is:
1. N-Ethylcarbaminomethylisoleucine.

* * * * *

UNITED STATES PATENT AND TRADEMARK OFFICE
CERTIFICATE OF CORRECTION

PATENT NO. : 3,919,291
DATED : November 11, 1975
INVENTOR(S) : SHIGESHI TOYOSHIMA ET AL It is certified that error appears in the above-identified patent and that said Letters Patent are hereby corrected as shown below:

In the heading, line [30], after "Foreign Application Priority Data" insert

-- Sept. 6, 1969   Japan ............   70716/1969 --

Signed and Sealed this seventeenth Day of February 1976

[SEAL]

Attest:

RUTH C. MASON
Attesting Officer

C. MARSHALL DANN
Commissioner of Patents and Trademarks